Patented June 12, 1945

2,378,196

UNITED STATES PATENT OFFICE 2,378,196

PREPARATION OF DIVINYL BENZENE PRODUCTS

Gaetano F. D'Alelio, Pittsfield, Mass., assignor to General Electric Company, a corporation of New York No Drawing. Application June 23, 1942,
Serial No. 448,157

2 Claims. (Cl. 260—91)

This invention relates to the preparation of synthetic resin compositions and more particularly to the preparation of heat-convertible, soluble, fusible polymers of divinyl benzene.

It is known that polymerization of compounds possessing more than one terminal

grouping, providing the system is not conjugated, results in the formation of a cross-linked, insoluble, infusible polymer. Examples of such compounds are glycol dimethacrylate, diallyl succinate, diallyl phthalate, diallyl maleate, allyl acrylate, diallyl oxalate, dimethallyl ether, etc. Divinyl benzene, polymerized in the usual manner, acts in the same fashion. When this compound is polymerized, an insoluble, very hard, infusible, nonworkable mass is obtained.

I have now discovered that divinyl benzene may be partially polymerized to a soluble and fusible heat-convertible mass, thus making available for commercial use a product heretofore inapplicable. The process by which a soluble, fusible partial polymer of divinyl benzene may be isolated from a dialkyl benzene, having at least two carbon atoms in each alkyl grouping, comprises polymerizing the solution of divinyl benzene in a dialkyl benzene in the presence of both carbon tetrachloride, which acts as an inhibitor, and a catalyst of polymerization for a time less than that required to cause separation of the polymer. The dissolved partial polymer is then precipitated by the addition of a non-solvent or by evaporation of the volatile constituents.

Present production of divinyl benzene (monomer) is carried out in such a manner that the resulting product is an inseparable mixture of about 20–30% divinyl benzene in diethyl benzene. The present invention is of special interest because it utilizes this inseparable mixture for which there has been no use until the present time.

Extensive experiments carried out on the polymerization of divinyl benzene in a dialkyl benzene indicate that an insoluble, infusible resin is obtained as a gel when ordinary polymerization methods are employed. This gel formation or precipitation takes place in a very short time, e. g., 15–20 minutes. The extreme sensitivity of this resin precludes its use in industrial applications. By means of this invention I may cause the polymer to be formed at a much slower rate, thus providing a greater permissible deviation from any calculated time required to give a maximum yield of partial polymer. As seen in the following examples, whereas the divinyl benzene solution alone gelled in about 10 minutes when it was polymerized with 0.50 part benzoyl peroxide, when carbon tetrachloride was employed the solution had not yet gelled at the end of 120 minutes. Furthermore, a sodium fusion test as well as a flame test on the purified polymer showed that some carbon tetrachloride had co-reacted or polymerized with the divinyl benzene. This was entirely unexpected and unpredictable.

The actual polymerization of the divinyl benzene from its solution in a dialkyl benzene is carried out as previously indicated in the presence of a catalyst. Any suitable method may be employed. For example, the mixture may be activated by light having wave lengths of the order of ultra-violet radiations. However, I prefer to cause polymerization under the influence of external heat in the presence of a catalyst for a period substantially less than that required to cause gellation of the solution. For purposes of economy, and convenience I prefer to use reflux temperature and atmospheric pressure, although other elevated temperatures and pressures, ranging from subatmospheric to superatmospheric pressure, may be used. The partial polymer of divinyl benzene may be precipitated from the dialkyl benzene by the addition of some non-solvent, e. g., methyl alcohol, ethyl alcohol, glycol, etc.

For polymerization catalysts in the polymerization of divinyl benzene I may use ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., ketone peroxides, e. g., acetone peroxide, triacetone peroxide, alkyl derivatives of hydrogen peroxide, e. g., ethyl hydrogen peroxide, diethyl peroxide, etc., mixed organic peroxides, e. g., acetyl benzoyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. However, benzoyl peroxide is a preferred catalyst. Any suitable amount of catalyst may be used but, in general, the catalyst concentration will be within the range of 0.1–2.0% by weight of divinyl benzene.

In order that those skilled in the art may better understand this invention the following examples are given in which all parts are by weight.

Example 1

| | Parts by weight |
|---|---|
| Divinyl benzene (106 parts of 23% sol'n. in diethyl benzene) | 24.4 |
| Benzoyl peroxide | 0.25 |

The above ingredients were refluxed for 17 minutes. At this point the resin gelled. With 0.5 part benzoyl peroxide the solution gelled in a shorter time, that is, in the order of 10 minutes.

Example 2

| | Parts by weight |
|---|---|
| Divinyl benzene (212 parts of 23% sol'n. in diethyl benzene) | 50 |
| Carbon tetrachloride | 50 |
| Benzoyl peroxide | 1 |

The above ingredients were refluxed for a period of 2 hours. The thickened solution was now poured into methanol and precipitated. The partial polymer was thoroughly triturated and dried and ground, yielding an easily fusible polymer at elevated temperatures, e.g., 140° C.

Example 3

| | Parts by weight |
|---|---|
| Divinyl benzene (87 parts of 23% sol'n. in diethyl benzene) | 20 |
| Diallyl ether | 30 |
| Carbon tetrachloride | 50 |
| Benzoyl peroxide | 0.5 |

The above ingredients were refluxed 100 minutes and then poured into methanol. The precipitate was thoroughly triturated under methanol, dried and ground to a fine powder. The yield was 23 parts. The partial copolymer obtained was fusible on a hot plate at 140° C. and soluble in toluene and styrene.

Example 4

| | Parts by weight |
|---|---|
| Divinyl benzene (108 parts of 23% sol'n. in diethyl benzene) | 25 |
| Diallyl phthalate | 25 |
| Carbon tetrachloride | 50 |
| Benzoyl peroxide | 0.5 |

The above ingredients were refluxed 100 minutes and poured into methanol. The precipitate was thoroughly triturated under methanol, dried and ground to a fine powder. The yield was 24 parts. The partial copolymer obtained was fusible on a hot plate at 140° C. and soluble in toluene and styrene.

What I claim as new and desire to secure by Letters Patent of the United States is:

1. The process which comprises reacting under heat a mixture consisting of a solution of 20–30% of divinyl benzene in diethyl benzene and carbon tetrachloride, until a fusible, heat-convertible, partial polymer of co-reacted divinyl benzene and carbon tetrachloride is formed, and isolating the partial polymer.

2. The solid, fusible, heat-convertible, partial polymer of divinyl benzene and carbon tetrachloride produced in accordance with the process of claim 1.

GAETANO F. D'ALELIO.